United States Patent
Yamamoto

[11] Patent Number: 5,773,915
[45] Date of Patent: Jun. 30, 1998

[54] VIBRATING GYROSCOPE

[75] Inventor: Shigeto Yamamoto, Shiga-ken, Japan

[73] Assignee: Murata Manufacturing Co., Ltd., Japan

[21] Appl. No.: 692,772

[22] Filed: Aug. 6, 1996

[30] Foreign Application Priority Data

| Aug. 8, 1995 | [JP] | Japan | 7-20249 |
| Jul. 24, 1996 | [JP] | Japan | 8-194911 |

[51] Int. Cl.⁶ .................................................. H01L 41/08
[52] U.S. Cl. ........................ 310/348; 310/321; 310/316; 310/351; 310/317
[58] Field of Search .................................. 310/316, 317, 310/315, 321, 323, 328, 348, 345, 351–353, 366, 367

[56] References Cited

U.S. PATENT DOCUMENTS

| 3,404,298 | 10/1968 | Roberts | 310/317 X |
| 3,716,828 | 2/1973 | Massa | 310/337 X |
| 4,043,109 | 8/1977 | Numabe | 310/346 X |
| 4,532,450 | 7/1985 | McNeel et al. | 310/329 |
| 4,719,384 | 1/1988 | Hauden et al. | 310/344 X |
| 4,799,385 | 1/1989 | Hulsing et al. | 73/505 |
| 5,012,174 | 4/1991 | Adkins et al. | 318/649 |
| 5,256,929 | 10/1993 | Terajima | 310/351 |
| 5,270,607 | 12/1993 | Terajima | 310/316 |
| 5,355,034 | 10/1994 | Nakamura et al. | 307/491 |
| 5,400,269 | 3/1995 | White et al. | 364/570 |
| 5,412,204 | 5/1995 | Nakamura et al. | 250/231.12 |
| 5,493,166 | 2/1996 | Kasanami et al. | 310/321 X |

FOREIGN PATENT DOCUMENTS

| 0520467A2 | 6/1992 | European Pat. Off. . |
| 0520467A3 | 6/1992 | European Pat. Off. . |
| 0520468A2 | 6/1992 | European Pat. Off. . |
| 0597338 | 10/1993 | European Pat. Off. . |
| 64-16911 | 1/1989 | Japan . |
| 0579974 | 6/1993 | Japan . |

*Primary Examiner*—Mary O. Budd
*Attorney, Agent, or Firm*—Ostrolenk, Faber, Gerb & Soffen, LLP

[57] ABSTRACT

A vibrating gyroscope having a vibratable body in the form of a triangular prism, piezoelectric elements formed on side surfaces of the vibrating body and having the same vibration characteristics and a detection circuit having two input terminals connected to two of the piezoelectric elements to detect the difference between the outputs from the two piezoelectric elements, the two detection piezoelectric elements being selected such that the difference between their outputs with respect to a change in ambient atmosphere temperature is the smallest.

11 Claims, 7 Drawing Sheets

VIBRATING GYROSCOPE

BACKGROUND OF THE INVENTION

1. Field of the Invention

The present invention relates to a vibrating gyroscope which can be used for a navigation system that provides navigational guidance by detecting a rotational angular velocity to detect the position of a moving object, or used for an anti-vibration system, such as a camerashake prevention apparatus, that prevents the adverse effects of shaking by detecting a rotational angular velocity due to external vibration, such as camera shake.

2. Description of the Related Art

Figure 1:
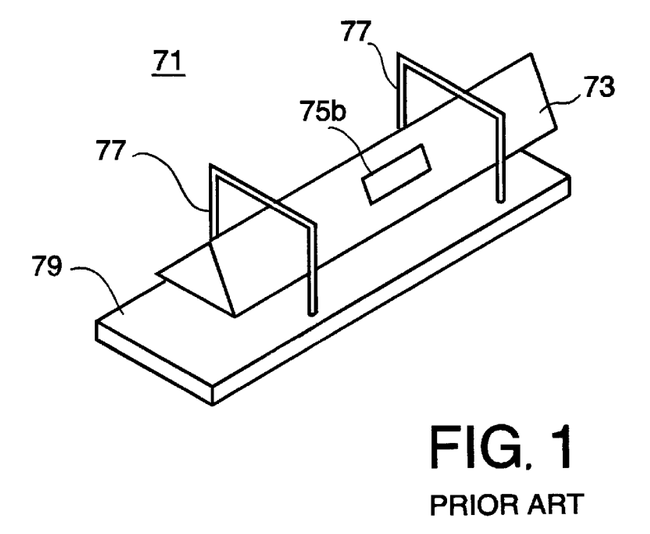
FIG. 1 is a perspective view of an essential portion representing a vibrator portion of a conventional vibrating gyroscope.
Figure 2:
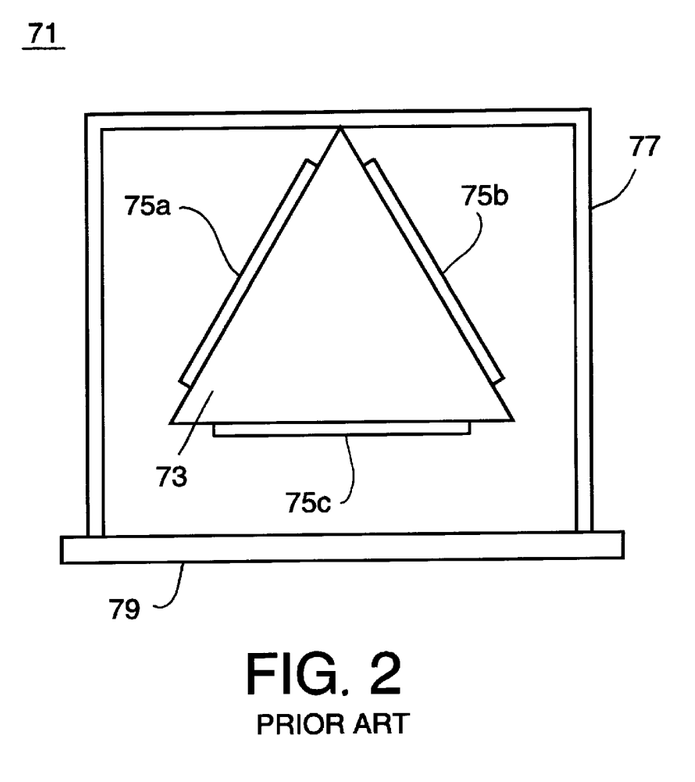
FIG. 2 is a front view of an essential portion representing the vibrator portion of the vibrating gyroscope shown in FIG. 1.

FIG. 1 is a perspective view of an essential portion of an example of a conventional vibrating gyroscope, and FIG. 2 is a front view thereof. As shown in FIGS. 1 and 2, a conventional vibrating gyroscope has a vibrator portion 71. The vibrator portion 71 includes a vibrating body 73 made of a permanently elastic metal generally in the form of a regular triangular prism. Piezoelectric elements 75a, 75b, 75c, each of which is a thin and generally rectangular member, are bonded to central portions of side surfaces of the vibrating body 73 with an adhesive. Of these piezoelectric elements, the piezoelectric elements 75a, 75b are used for driving and detection while the piezoelectric element 75c is used for feedback. A drive circuit (not shown in FIGS. 1 and 2) consisting of an oscillation circuit and a phase circuit is connected across the piezoelectric elements 75a, 75b and the piezoelectric element 75c as a feedback loop for causing self-excited vibration of the vibrating body 73. A detection circuit formed of a differential amplifier, etc. is connected to the piezoelectric elements 75a, 75b.

Two supporting members 77, each of which is a generally square-bottomed U-shaped member formed of a wire rod having a high elastic modulus, are fixed on the ridge line of the vibrating body 73 between the driving and detecting piezoelectric elements 75a and 75b and in the vicinity of nodal points of the vibrating body 73. Ends of the supporting members 77 are fixed to one major surface of a generally rectangular mount base plate 79 made of a glass-epoxy material or the like.

In the vibrating gyroscope, if a drive signal is applied across the feedback piezoelectric element 75c and the driving and detecting piezoelectric elements 75a, 75b, the vibrating body 73 vibrates under a bending mode in a direction perpendicular to the surface on which the feedback piezoelectric element 75c is formed. In the case where the vibrating body 73 is rotated, the direction of vibration of the vibrating body 73 is changed by the Coriolis force so that a difference is caused between the outputs from the piezoelectric elements 75a, 75b in response to the rotational angular velocity. This output difference is processed by signal processing in the detection circuit to detect the rotational angular velocity.

The conventional vibrating gyroscope has the drawback that the vibrating characteristics of the vibrating gyroscope may change or drift in response to the change of the ambient atmosphere. This is because the piezoelectric elements detect a stress other than the Coriolis force due to the differences of the thermal expansion coefficients among the vibrating member, the piezoelectric elements and the adhesive.

SUMMARY OF THE INVENTION

It is therefore, an object of the present invention to provide a vibrating gyroscope free from the above-described problem and capable of accurately detecting the rotational angular velocity even if the ambient atmosphere temperature changes.

To achieve the above-described object, according to the present invention, there is provided a vibrating gyroscope comprising a column-like vibratable body having a plurality of side surfaces, a plurality of piezoelectric elements each formed on a respective side surface of the vibratable body and having the same vibration characteristics, a detection circuit having two input terminals connected to two detecting piezoelectric elements to detect the difference between output signals from the two detecting piezoelectric elements, and supporting members attached to the vibrating body in the vicinity of nodal points of the vibrating body to support the vibrating body, wherein the two detecting piezoelectric elements are the two of the plurality of detecting piezoelectric elements which provide the smallest difference between their outputs with respect to a change in ambient atmosphere temperature.

More specifically, the vibrating gyroscope may comprise a plurality of connection terminals connected to the plurality of piezoelectric elements, and two lead wires having ends connected to two input terminals of the detection circuit and having opposite ends connected to selected two of the plurality of connection terminals, the detecting piezoelectric elements and the input terminals of the detection circuit being connected through the connection terminals and the lead wires.

Also, the vibrating gyroscope may comprise a plurality of connection terminals connected to the plurality of piezoelectric elements, and a change-over switch capable of changing the connection between the plurality of connection terminals and two input terminals of the detection circuit, the detecting piezoelectric elements and the input terminals of the detection circuit being connected through the connection terminals and the change-over switch.

In the vibrating gyroscope arranged as described above, any of the piezoelectric elements may be used as a detecting piezoelectric element since all the piezoelectric elements have the same vibration characteristics. In the conventional vibrating gyroscope, the direction of self-excited vibration of the vibrating body is fixed at one direction. However, since supporting members attached to the vibrating body in the vicinity of nodal points of the vibrating body do not largely impede the vibration of the vibrating body, there is no considerable problem even if the direction of self-excited vibration of the vibrating body is changed according to the positions of the detecting piezoelectric elements. Therefore, it is possible to select two detecting piezoelectric elements from the plurality of piezoelectric elements even after the vibrating body has been supported by the supporting members without previously determining the positions of detecting piezoelectric elements. If a combination of two detecting piezoelectric elements is selected such that the difference between the outputs with respect to a change in ambient atmosphere temperature is smallest, it is possible to accurately detect the rotational angular velocity even if the ambient atmosphere temperature changes.

In the case of the vibrating gyroscope having a plurality of connection terminals connected to the plurality of piezoelectric elements and two lead wires having their ends connected to two input terminals of the detection circuit and having their opposite ends connected to selected two of the plurality of connection terminals, the detecting piezoelectric elements connected to the input terminals of the detection circuit can be freely selected by changing the wiring using the lead wires.

Further, in the case of the vibrating gyroscope having a plurality of connection terminals connected to the plurality of piezoelectric elements, and a change-over switch capable of changing the connection between the plurality of connection terminals and two input terminals of the detection circuit, the detecting piezoelectric elements connected to the input terminals of the detection circuit can be freely selected by changing the change-over switch.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

Embodiment 1

Figure 3:
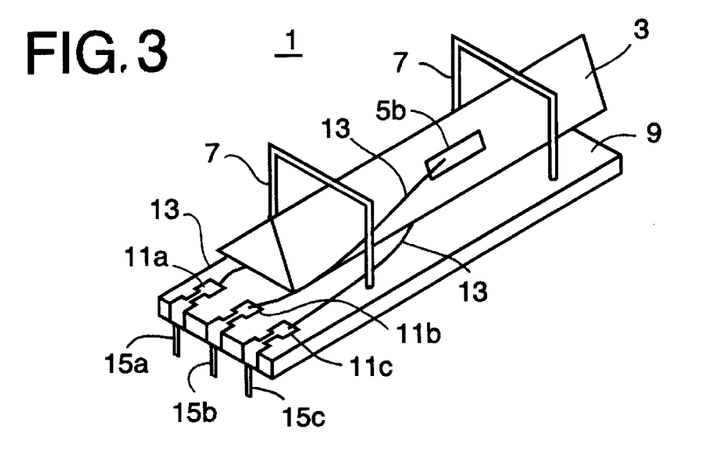
FIG. 3 is a perspective view of an essential portion representing a vibrator portion of a vibrating gyroscope in accordance with a first embodiment of the present invention.
Figure 4:
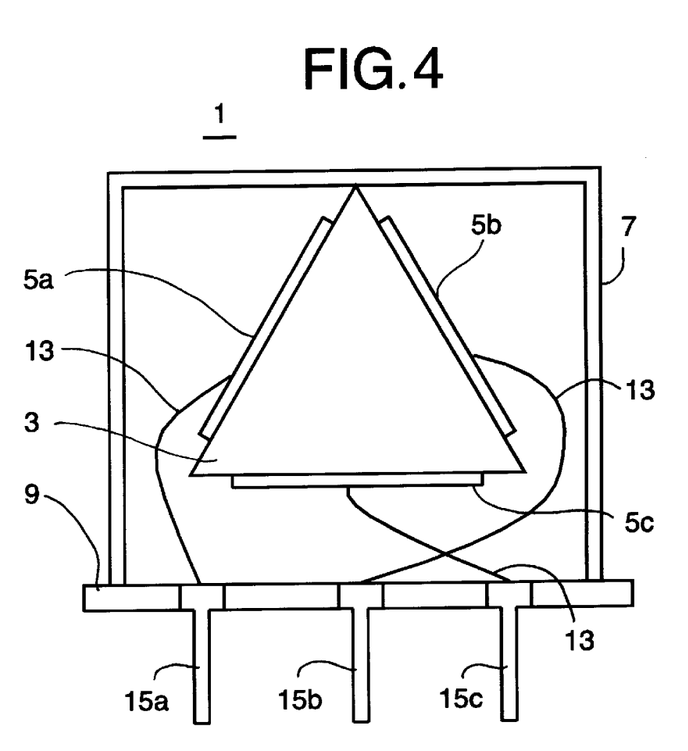
FIG. 4 is a front view of the essential portion representing the vibrator portion of the vibrating gyroscope shown in FIG. 3.

FIGS. 3 and 4 illustrate a vibrator portion 1 of a vibrating gyroscope, including a vibrating body 3. The vibrating body 3 is made of, for example, a permanently elastic metal such as elinvar or a material such as quartz, glass, crystal or ceramic capable of vibrating mechanically and is formed into substantially the same shape as a regular triangular prism. Piezoelectric elements $5a$, $5b$, $5c$ identical to each other in vibrating characteristics and in shape are formed on side surfaces of the vibrating body 3. Each of the piezoelectric elements $5a$, $5b$, $5c$ is made by forming electrodes on two surfaces of a piezoelectric ceramic member and one of these electrodes is bonded to the side surface of the vibrating body 3 with an adhesive or the like.

Two supporting members 7, each of which is a generally square bottomed U-shaped member in the form of a wire rod having a high elastic modulus, e.g., a tungsten wire rod, are fixed to the vibrating body 3 in the vicinity of nodal points of the vibrating body 3 by means of welding or the like. Ends of the supporting members 7 are fixed by means of soldering or the like to one major surface of a generally rectangular mount base plate 9 made of a glassepoxy material or the like. Three land electrodes $11a$, $11b$, $11c$ are formed on the one major surface of the mount base plate 9 and are connected to the piezoelectric elements $5a$, $5b$, $5c$ by lead wires 13. These land electrodes $11a$, $11b$, $11c$ are also connected to three lead terminals $15a$, $15b$, $15c$ provided at one end of the mount base plate 9 in the lengthwise direction.

In the vibrating gyroscope having the thus-arranged vibrator portion 1, two of the three piezoelectric elements $5a$, $5b$, $5c$ are used for driving and detection while the other one is used for feedback. A drive circuit (not shown in FIGS. 3 and 4) is connected between the driving piezoelectric elements and the feedback piezoelectric element as a feedback loop for causing selfexcited vibration of the vibrating body 3. The drive circuit is formed of an oscillation circuit and a phase circuit. A detection circuit formed of a differential amplifier circuit is connected to the detecting piezoelectric elements. In this case, as explained below in detail, two of the three piezoelectric elements are selected as detecting piezoelectric elements such that the difference between the outputs with respect to a change in ambient atmosphere temperature is smallest.

Figure 5:
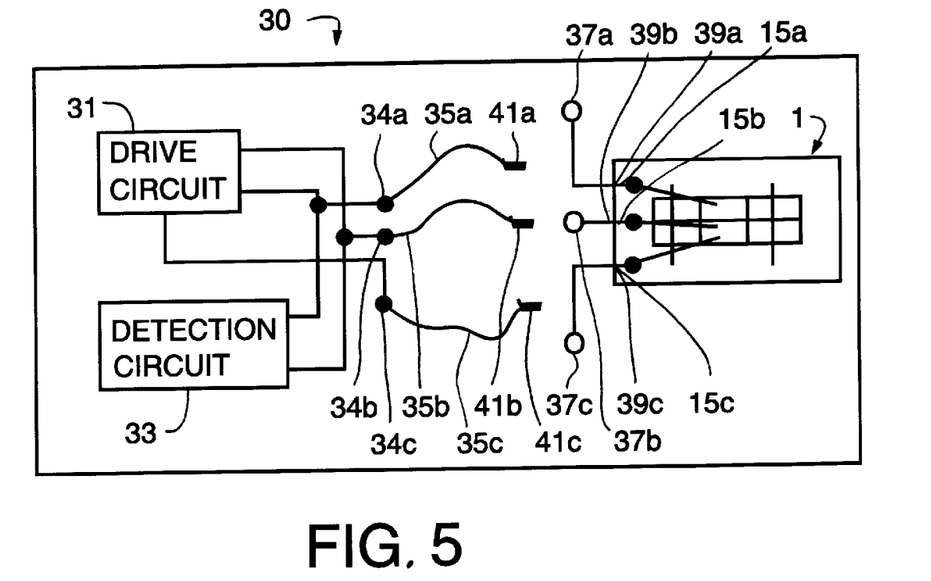
FIG. 5 is a diagram showing a jig used to select detecting piezoelectric elements.

A method of selecting the detecting piezoelectric elements in this vibrating gyroscope will next be described. First, a jig 30, such as that shown in FIG. 5, is prepared. The jig 30 has a drive circuit 31, a detection circuit 33, terminals $34a$, $34b$ which serve both as two output terminals of the drive circuit 31 and as two input terminals of the detection circuit 33, and a terminal $34c$ which serves as an input terminal of the drive circuit 31. Lead wires $35a$, $35b$, $35c$ having plugs $41a$, $41b$, $41c$ at their respective ends are connected to the terminals $34a$, $34b$, $34c$, respectively. Also, the jig 30 has three first connection terminals $37a$, $37b$, $37c$ capable of being fitted to the plugs $41a$, $41b$, $41c$ of the lead wires $35a$, $35b$, $35c$, and second connection terminals $39a$, $39b$, $39c$ to which the lead terminals $15a$, $15b$, $15c$ of the vibrator portion 1 can be coupled. The first connection terminals $37a$, $37b$, $37c$ and the second connection terminals $39a$, $39b$, $39c$ are connected to each other.

Figure 6:
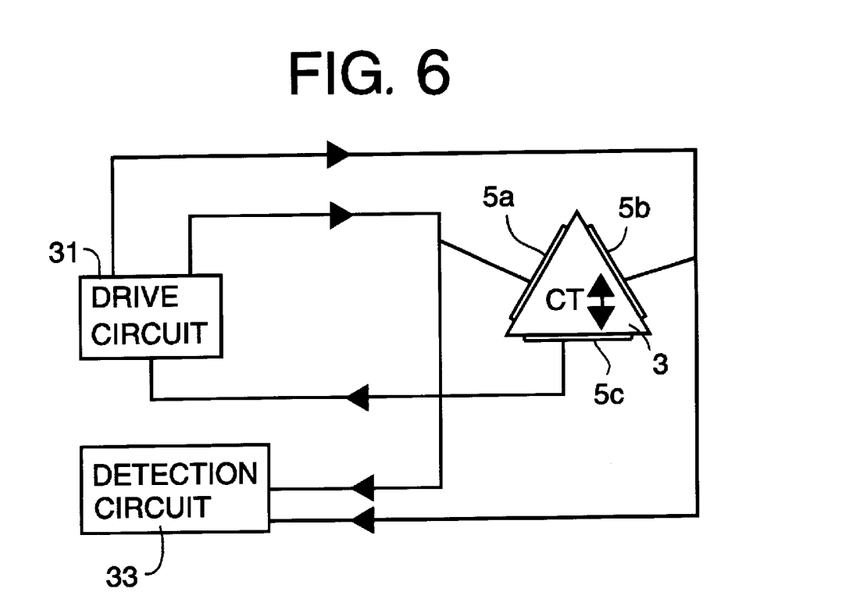
FIG. 6 is a circuit diagram showing one connected relationship between piezoelectric elements, a drive circuit and a detection circuit.

The lead terminals $15a$, $15b$, $15c$ of the vibrator portion 1 are respectively fitted to the second connection terminals $39a$, $39b$, $39c$ of the jig 30 to attach the vibrator portion 1 to the jig 30. Then the plugs $41a$, $41b$, $41c$ of the lead wires $35a$, $35b$, $35c$ are respectively fitted to the first connection terminals $37a$, $37b$, $37c$. The piezoelectric elements are thereby connected as shown in FIG. 6; the piezoelectric elements $5a$, $5b$ of the vibrator portion 1 are respectively connected to the two output terminals of the drive circuit 31 and to the two input terminals of the detection circuit 33 while the piezoelectric element 5c is connected to the input terminal of the drive circuit 31, thereby causing self-excited vibration of the vibrating body 3 in a direction CT which is the result of combining the driving directions of the piezoelectric elements 5a, 5b for driving.

Next, after phase and level adjustment of drive signals of the drive circuit 31, outputs of the piezoelectric elements 5a, 5b for detection are measured while the vibrating body 3 is being heated, for example, with a drier or the like. Alternatively, the phase and level adjustment may be omitted. In such a case, outputs of the piezoelectric elements 5a and 5b, 5b and 5c, 5c and 5a are first measured at the room temperature while vibrating the vibrating body 3 in a direction CT, L, and R, respectively. Then, the vibrating body 3 is kept heated with a drier or the like and outputs of the piezoelectric elements 5a and 5b, 5b and 5c, and 5c and 5a are again measured at the high temperature while vibrating the vibrating body in a direction CT, L, and R, respectively.

Thereafter, the vibrating body 3 is cooled to restore the state of the vibrating body 3 at the room temperature.

Figure 7:
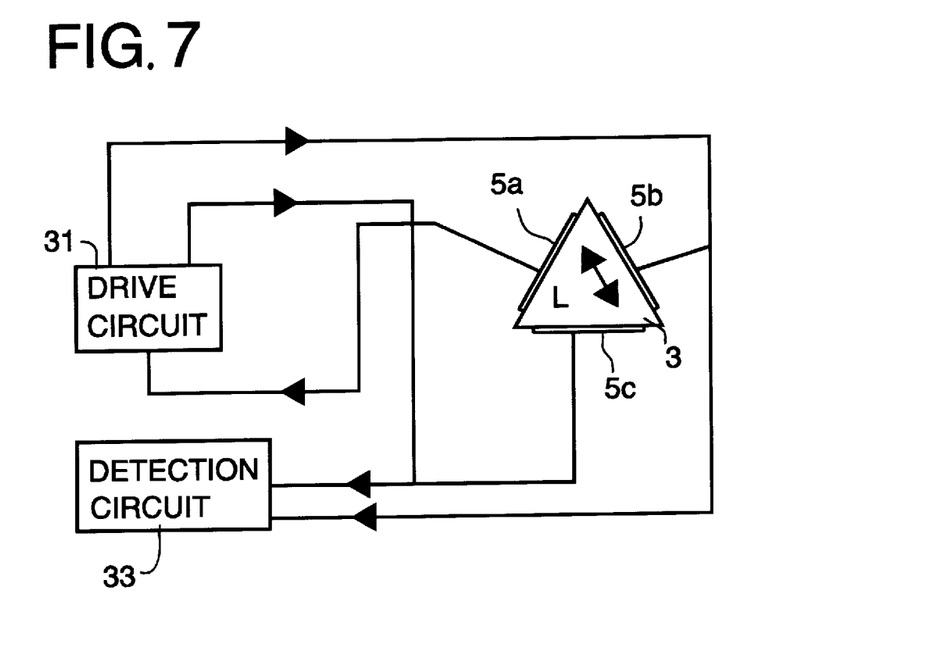
FIG. 7 is a circuit diagram showing another connected relationship between the piezoelectric elements, the drive circuit and the detection circuit.

Next, the plugs 41a, 41b, 41c of the lead wires 35a, 35b, 35c are detached from the first connection terminals 37a, 37b, 37c. Then the plug 41a is fitted to the first connection terminal 37c; the plug 41b to the first connection terminal 37b; and the plug 41c to the first connection terminal 37a. The piezoelectric elements are thereby connected as shown in FIG. 7; the piezoelectric elements 5b, 5c of the vibrator portion 1 are respectively connected to the two output terminals of the drive circuit 31 and to the two input terminals of the detection circuit 33 while the piezoelectric element 5a is connected to the input terminal of the drive circuit 31, thereby causing self-excited vibration of the vibrating body 3 in a direction L which is the result of combining the driving directions of the piezoelectric elements 5b, 5c operated for driving.

Next, after phase and level adjustment of drive signals of the drive circuit 31, outputs of the piezoelectric elements 5b, 5c operated for detection are measured while the vibrating body 3 is being heated, for example, with a drier or the like. Thereafter, the vibrating body 3 is cooled to restore the state of the vibrating body 3 at the room temperature.

Figure 8:
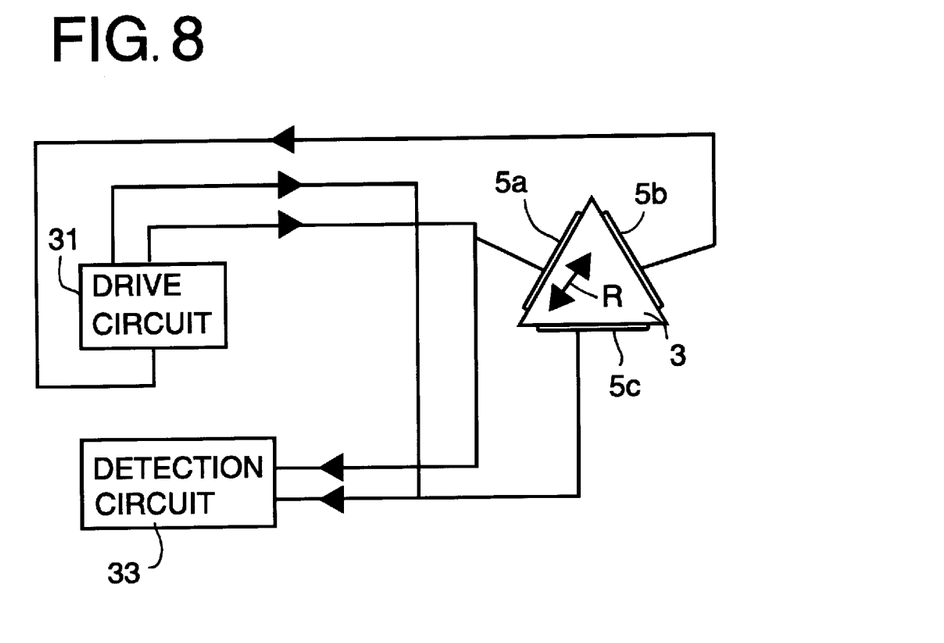
FIG. 8 is a circuit diagram showing a further connected relationship between the piezoelectric elements, the drive circuit and the detection circuit.

Next, the plugs 41a, 41b, 41c of the lead wires 35a, 35b, 35c are detached from the first connection terminals 37c, 37a, 37b. Then the plug 41a is fitted to the first connection terminal 37a; the plug 41b to the first connection terminal 37c; and the plug 41c to the first connection terminal 37b. The piezoelectric elements are thereby connected as shown in FIG. 8; the piezoelectric elements 5a, 5c of the vibrator portion 1 are respectively connected to the two output terminals of the drive circuit 31 and to the two input terminals of the detection circuit 33 while the piezoelectric element 5b is connected to the input terminal of the drive circuit 31, thereby causing self-excited vibration of the vibrating body 3 in a direction R which is the result of combining the driving directions of the piezoelectric elements 5a, 5c operated for driving.

Next, after phase and level adjustment of drive signals of the drive circuit 31, outputs of the piezoelectric elements 5a, 5c operated for detection are measured while the vibrating body 3 is being heated, for example, with a drier or the like. Thereafter, the measured outputs of the three combinations are compared to select the combination with the minimum differential output as determined detecting piezoelectric elements. This means that the direction of vibration of the vibrating body 3 is selected by determining which of the piezoelectric elements 5a, 5b, 5c is used for feedback. In this way, two of the piezoelectric elements 5a–5c are determined so as to work as a driving and detecting element and the remaining one of the piezoelectric elements 5a–5c is determined so as to work as a feedback element.

The following table shows experimental results of ten samples obtained by the aforementioned method. In the table, drifts of the vibrating characteristics were measured between −40 and 85 Data shown with an asterisk represent the smallest value obtained in the three directions and means that that direction of vibration should be chosen for the preferable direction of vibration.

TABLE

| | Drift (deg./sec.) in the specific direction of vibration | | | Preferable direction of vibration | |
|---|---|---|---|---|---|
| Sample No. | L | CT | R | Direction | Drift |
| 1 | 12.3 | 5.0* | 13.6 | CT | 5.0 |
| 2 | 9.9 | 5.7* | 11.5 | CT | 5.7 |
| 3 | 5.3 | 1.8* | 7.2 | CT | 1.8 |
| 4 | 5.0* | 11.3 | 12.1 | L | 5.0 |
| 5 | 5.7* | 8.5 | 10.1 | L | 5.7 |
| 6 | 1.8* | 11.7 | 9.6 | L | 1.8 |
| 7 | 7.9 | 10.4 | 4.5* | R | 4.5 |
| 8 | 8.2 | 7.8 | 1.3* | R | 1.3 |
| 9 | 10.8 | 12.3 | 5.1* | R | 5.1 |
| 10 | 11.1 | 8.9 | 4.2* | R | 4.2 |
| Average | | 8.3 | | | 4.0 |
| Standard Deviation | | 3.2 | | | 1.3 |

As is apparent from the table, if the ten vibrating gyroscopes are made vibrating in the same direction, for example, direction of CT, without choosing a preferable direction based on the measured smallest drift, the average value on the drift becomes 8.3 deg/sec. On the other hand, if the ten vibrating gyroscopes are made vibrating in the respective directions selected based on the measured smallest drift, the average value on the drift becomes 4.0 deg/sec.

Embodiment 2

According to the aforementioned Embodiment 1, three types of the vibrator portion 1 are manufactured depending on which piezoelectric element of the three is used for feedback. Thus, lead terminals 15a–15c shown in FIG. 3 must be electrically connected to the driving circuit and the detection circuit in accordance with the types of the vibrator portion 1. This means that three types of a circuit board which receives the vibrator portion 1 and has a driving circuit and the detection circuit must be prepared. However, the preparation of circuit boards corresponding to the different vibrator portions 1 entails a problem in terms of cost and management. An embodiment of a vibrating gyroscope in which one circuit board is adaptable to three types of vibrator portion 1 will now be described with reference to the drawings.

Figure 9:
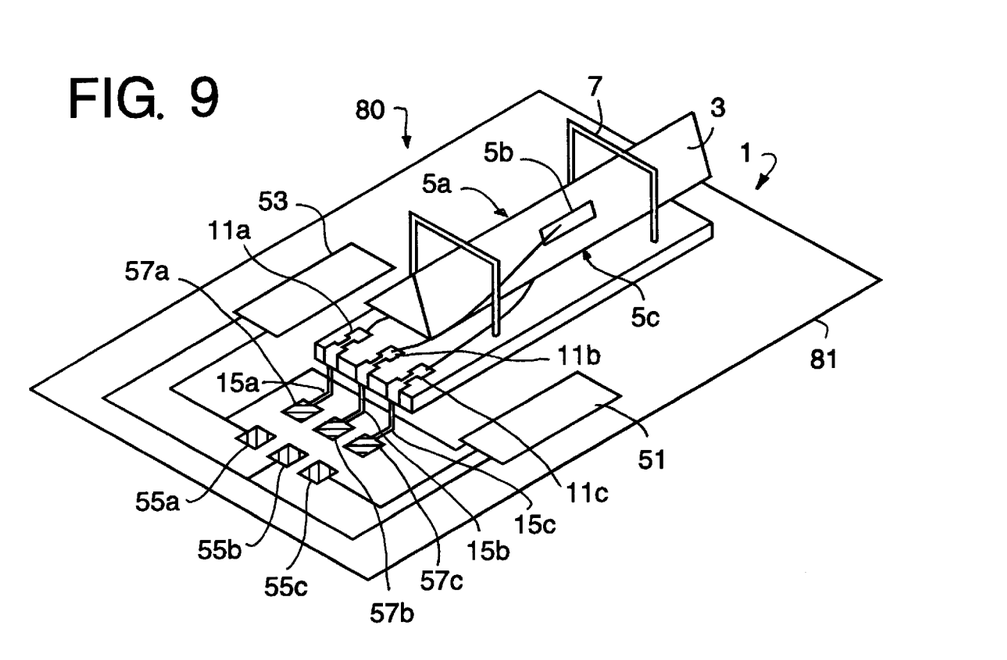
FIG. 9 is a circuit diagram of an essential portion of a vibrating gyroscope in accordance with a second embodiment of the present invention.

FIG. 9 illustrates a vibrating gyroscope 80 having a vibrator portion 1 and a circuit board 81. The vibrator portion 1 is identical to the vibrator portion 1 shown in FIG. 3. The circuit board 81 includes a drive circuit 51, a detection circuit 53, terminals 55a, 55b, 55c and connection terminals 57a, 57b, 57c. The terminals 55a and 55b are electrically connected to both the drive circuit 51 and detection circuit 53 and serve both as output terminals of the drive circuit 51 and as input terminals of the detection circuit 53. The terminal 55c is also electrically connected to the drive circuit 51 and serves as an input terminal of the drive circuit 53. The connection terminals 57a, 57b, and 57c are respectively connected to lead terminals 15a, 15b, and 15c of the vibrator portion 1. These components are formed on the circuit board 81.

Figure 10A:
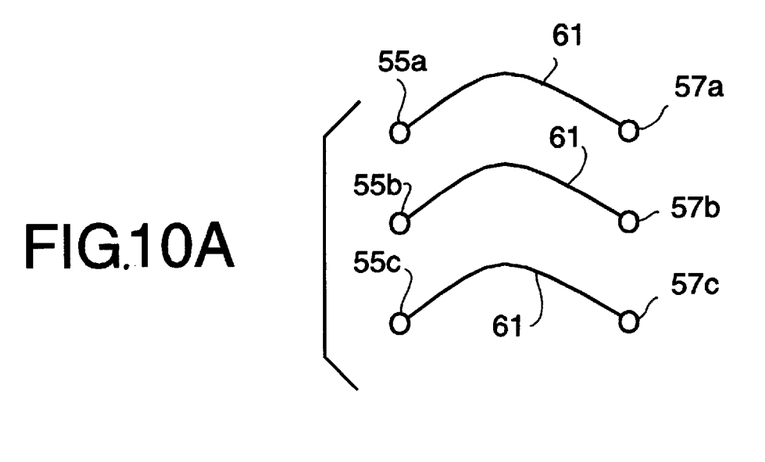
FIGS. 10A to 10C are diagrams in which the piezoelectric elements, the drive circuit and the detection circuit are connected through lead wires in the vibrating gyroscope shown in FIG. 9.
Figure 10B:
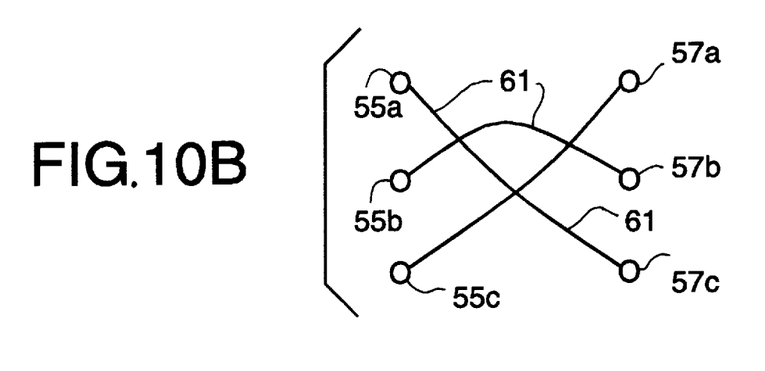
Figure 10C:
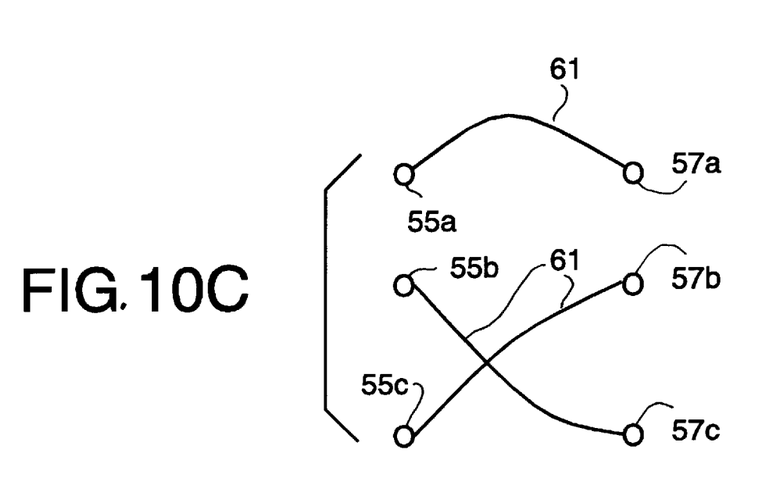

In one embodiment of the present invention, a wiring is formed by lead wires between the terminals 55a, 55b, 55c and the connection terminals 57a, 57b, 57c according to each of the three types of vibrator portion 1. That is, if the piezoelectric elements 5a, 5b are used for driving and detection while the piezoelectric element 5c is used for feedback, each of the pair of the terminal 55a and the connection terminal 57a, the pair of the terminal 55b and the connection terminal 57b and the pair of the terminal 55c and the connection terminal 57c are connected by lead wire 61, as shown in FIG. 10A. If the piezoelectric elements 5b, 5c are used for driving and detection while the piezoelectric element 5a is used for feedback, each of the pair of the terminal 55a and the connection terminal 57c, the pair of the terminal 55b and the connection terminal 57b and the pair of the terminal 55c and the connection terminal 57a are connected by lead wire 61, as shown in Fig. 10B. Further, if the piezoelectric elements 5a, 5c are used for driving and detection while the piezoelectric element 5b is used for feedback, each of the pair of the terminal 55a and the connection terminal 57a, the pair of the terminal 55b and the connection terminal 57c and the pair of the terminal 55c and the connection terminal 57b are connected by lead wire 61, as shown in Fig. 10C.

As understood from the above-explanation, by connecting terminals 55a, 55b, 55c and the connection terminals 57a, 57b, 57c using lead wires, the piezoelectric elements 5c, 5a and 5b of the vibrator portion 1 are selectively connected with a drive circuit and a detection circuit so that predetermined one of the piezoelectric elements 5c, 5a and 5b is used for feedback. Thus, one circuit board is adaptable to three types of vibrator portion in which vibrating body vibrate in different directions, thereby reducing the production cost.

Figure 11:
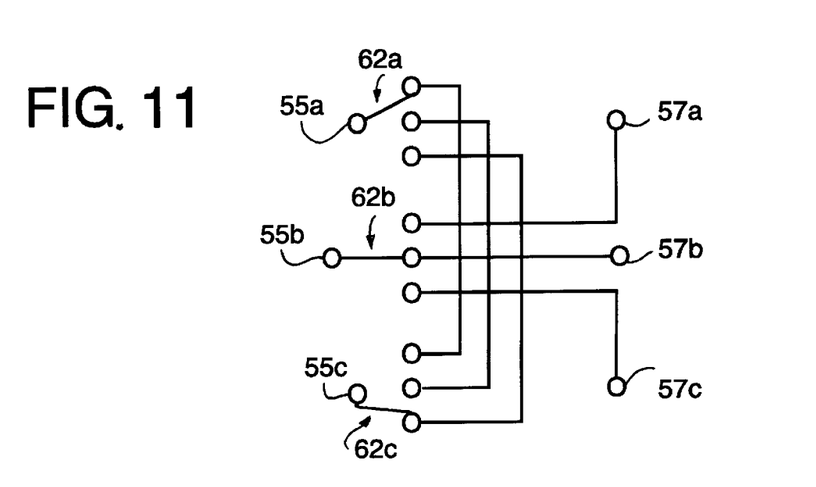
FIG. 11 is a diagram of a case in which the piezoelectric elements, the drive circuit and the detection circuit are connected through change-over switches in the vibrating gyroscope shown in FIG. 9.

As alternative embodiment shown in FIG. 11, change-over switches 62a, 62b, 62c may be respectively provided between the terminals 55a, 55b, 55c and the connection terminals 57a, 57b, 57c instead of using wiring. If the piezoelectric elements 5a, 5b are used for driving and detection while the piezoelectric element 5c is used for feedback, each of the pair of the terminal 55a and the connection terminal 57a, the pair of the terminal 55b and the connection terminal 57b and the pair of the terminal 55c and the connection terminal 57c are connected by operating the change-over switches 62a, 62b, 62c. If the piezoelectric elements 5b, 5c are used for driving and detection while the piezoelectric element 5a is used for feedback, each of the pair of the terminal 55a and the connection terminal 57c, the pair of the terminal 55b and the connection terminal 57b and the pair of the terminal 55c and the connection terminal 57a are connected by operating the change-over switches 62a, 62b, 62c. Further, if the piezoelectric elements 5a, 5c are used for driving and detection while the piezoelectric element 5b is used for feedback, each of the pair of the terminal 55a and the connection terminal 57a, the pair of the terminal 55b and the connection terminal 57c and the pair of the terminal 55c and the connection terminal 57b are connected by operating the change-over switches 62a, 62b, 62c.

Embodiment 3

Figure 12:
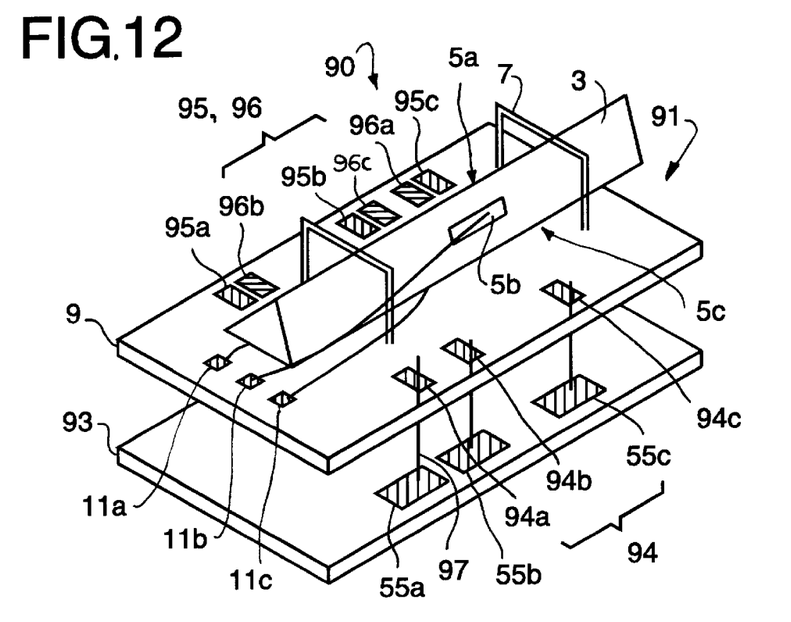
FIG. 12 is a perspective view of a vibrating gyroscope in accordance with a third embodiment of the present invention.
Figure 13:
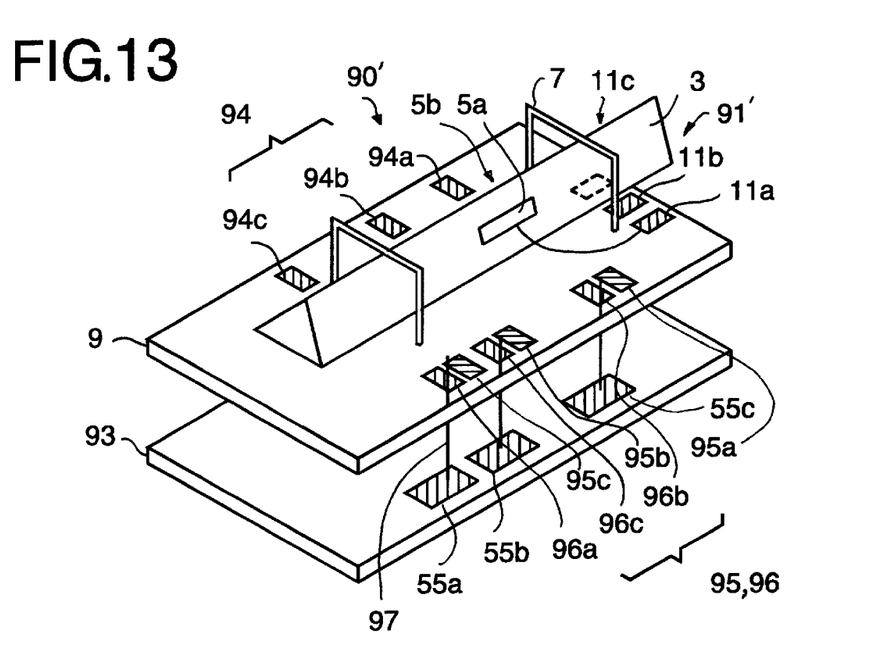
FIG. 13 is another perspective view of a vibrating gyroscope in accordance with the third embodiment of the present invention.

FIGS. 12 and 13 are perspective views of a vibrating gyroscope in accordance with a third embodiment of the present invention. The vibrating gyroscope 90 shown in FIG. 12 includes a vibrator portion 91 and a circuit board 93. The vibrating gyroscope 90 ' shown in FIG. 13 also includes a vibrator portion 91 ' and a circuit board 93, but the vibrator portion 91 'shown in FIG. 13 is positioned rotated by 180° degrees with respect to the circuit board 93.

The vibrator portion 91 (or 91 ') is identical to the vibrator portion 1 except that the vibrator portion 91 (or 91 ') has lead terminal connecting portions 94, 95, 96 formed on the mount base plate 9 instead of lead terminals 15a, 15b, 15c. Each of the lead terminal connecting portions 94, 95, 96 consists of three connecting electrodes, namely, connecting electrodes 94a–94c, 95a–95c, and 96a–96c. The connecting electrodes 94a, 95a, 96a are electrically connected to the land electrodes 11a via a conductive pattern (not shown in FIGS. 12 and 13 for the sake of clarity) formed on the front surface and rear surface of the mount base plate 9. The connecting electrodes 94b, 95b, 96b and 94c, 95c, 96c are also electrically connected to the land electrodes 11b and 11c, respectively.

The circuit board 93 includes a drive circuit, a detection circuit and terminals 55a, 55b, 55c formed thereon, respectively. The drive circuit and detection circuit are not shown in Figs, 12 and 13 for the sake of clarity but are electrically connected to the terminals 55a, 55b, 55c as shown in FIG. 9. As is explained above, the terminal 55c is used for connecting the drive circuit and the piezoelectric element for feedback. The terminals 55a, 55b, 55c are located at the vicinity of a side of the circuit board 93. Two holes or through holes are provided with each of the terminals 55a, 55b, 55c so as to receive lead wires.

The lead terminal connecting portions 94 are located along and at the vicinity of one of opposite two sides of the mount base plate 9, while the lead terminal connecting portions 95, 96 are located along and at the vicinity of the other of opposite two sides of the mount base plate 9. More specifically, as shown in FIG. 12, the connecting electrodes 94a–94c of the lead terminal connecting portions 94 are located on the mount base plate 9 at a predetermined distance so as to position above the terminals 55a, 55b, 55c in the case where the vibrator portion 91 and a circuit board 93 are coupled via the lead wires. Moreover, as shown in FIG. 13, the connecting electrodes 95a–95c and 96a–96c are respectively located on the mount base plate 9 at a predetermined distance so as to be positioned above the terminals 55a, 55b, 55c in the case where the vibrator portion 91 is rotated by 18° degrees with respect to the circuit board 93 from the configuration shown in FIG. 12. Thus, the connecting electrodes 94c, 95a, 96b can be positioned above the terminal 55c and connected via lead wires 97. Since the connecting electrodes 94c, 95a, 96b are respectively connected to the piezoelectric elements 5c, 5a, 5b and the terminal 55c is used for feedback, either of the piezoelectric elements 5c, 5a, 5b can be used for feedback and the remaining two of the piezoelectric elements 5c, 5a, 5b can be used for detection.

As understood from the above-explanation, by using the lead terminal connecting portions 94, 95 and 96, the piezoelectric elements 5c, 5a and 5b of the vibrator portion 91 (or 91 ') are selectively connected with a drive circuit and a detection circuit so that predetermined one of the piezoelectric elements 5c, 5a and 5b is used for feedback.

The vibrating gyroscope 91 (or 91 ') is manufactured for example, by the following process. First, the vibrating body 3 is prepared and the piezoelectric elements 5a–5c are disposed on a side faces of the vibrating body 3. Two supporting members 7 each of which is a generally square bottomed U-shape member in the form of a wire rod having a high elastic modulus, e.g., a tungsten wire rod are then fixed to the vibrating body 3 in the vicinity of nodal points of the vibrating body 3 by means of welding or the like. Ends of the supporting members 7 are fixed by means of soldering or the like to one major surface of a mount base plate 9 on which land electrodes 11a–11c and the connecting electrodes 94a–94c, 95a–95c, and 96a–96c are formed. Note that one of the essential features of the present invention is that the vibrating direction of the vibrating body 3 can be selected after the vibrating body 3 is fixed to the supporting members 7. Thus, it is not required to measure any physical properties which indicate or represent a preferable vibrating direction of the vibrating body 3 before fixing the vibrating body 3 to the supporting member 7.

Thereafter, vibrator portion 91 (or 91 ') manufactured by the aforementioned steps is examined so as to determine the which of the piezoelectric elements 5a-5c should be used for feedback using the jig 30 as explained above referring to FIG. 5.

Then, the vibrating portion 91 (or 91 ') is mounted on the circuit board 93 having a drive circuit, a detection circuit and terminals 55a, 55b, 55c thereon. Specifically, if the piezoelectric elements 5c should be used for feedback, the vibrating portion 91 is so located that the connecting electrodes 94a–94c are positioned corresponding to the terminals 55a–55c, and the connecting electrodes 94a–94c and the terminals 55a–55c are electrically connected via lead wires 97, as shown in FIG. 12. On the other hand, if the piezoelectric elements 5a should be used for feedback, the vibrating portion 91 ' is so located that the connecting electrodes 95a–95c are positioned corresponding to the terminals 55a–55c, and the connecting electrodes 95a–95c and the terminals 55a–55c are electrically connected via lead wires 97, as shown in FIG. 13. It is appreciated that the connecting electrodes 96a–96c should be selected in the case where the piezoelectric elements 5b is used for feedback.

In the thus-constructed vibrating gyroscope, a combination of two detecting piezoelectric elements is selected such that the difference between the outputs with respect to a change in ambient atmosphere temperature is smallest, thereby making it possible to accurately detect the rotational angular velocity even if the ambient atmosphere temperature changes.

Each of the embodiments has been described with respect to the case where one piezoelectric element is used both for drive and detection. However, the present invention is not limited to this, and driving piezoelectric elements may be provided independently of detecting piezoelectric elements.

The vibrating body has been described as a member having the shape of a triangular prism. However, the vibrating member may have any shape other than the triangular prism, e.g., a polygonal prism or a cylinder. Also, the number of piezoelectric elements formed on side surfaces of the vibrating body is not limited.

In the vibrating gyroscope of the present invention, as described above, a combination of two detecting piezoelectric elements such that the difference between the outputs with respect to a change in ambient atmosphere temperature is smallest is selected after the vibrating body has been supported by supporting members, thereby making it possible to accurately detect the rotational angular velocity even if the ambient atmosphere temperature changes.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising a column-like vibratable body having a plurality of side surfaces, a plurality of piezoelectric elements each formed on a respective side surface of the vibratable body and having the same vibration characteristics, supporting members attached to the vibratable body in the vicinity of nodal points of the vibrating body to support the vibratable body, and a detection circuit having two input terminals connected to two detecting piezoelectric elements to detect the difference between output signals from the two detecting piezoelectric elements, the two detecting piezoelectric elements being the two of the plurality of piezoelectric elements which provide the smallest difference between their outputs with respect to a change in ambient atmosphere temperature.

2. A vibrating gyroscope according to claim 1, further comprising a plurality of connection terminals connected to the plurality of piezoelectric elements, and two lead wires having ends connected to two input terminals of the detection circuit and having opposite ends connected to selected two of the plurality of connection terminals, the detecting piezoelectric elements and the input terminals of the detection circuit being connected through the connection terminals and the lead wires.

3. A vibrating gyroscope comprising:

a column-like vibratable body having a plurality of sides;

a plurality of piezoelectric elements each formed on a respective side surface of the vibratable body and having the same vibration characteristics;

supporting members attached to the vibratable body in the vicinity of nodal points of the vibratable body to support the vibratable body;

a detection circuit having two input terminals connected to two detecting piezoelectric elements to detect the difference between output signals from the two detecting piezoelectric elements;

a plurality of connection terminals connected to the plurality of piezoelectric elements; and a change-over switch capable of changing the connection between the plurality of connection terminals and two input terminals of the detection circuit, the detecting piezoelectric elements and the input terminals of the detection circuit being connected through the connection terminals and the change-over switch.

4. A vibrating gyroscope comprising:

a column-like vibratable body having a plurality of side surfaces;

first, second and third piezoelectric elements each formed on a respective side surface of the vibrating body and having the same vibration characteristics;

supporting members attached to the vibratable body in the vicinity of nodal points of the vibratable body to support the vibratable body;

a mount base plate connected to the supporting members to support the vibrating body;

a circuit board having a drive circuit for driving the vibrating body and a detection circuit for detecting vibration of the vibrating body; and a circuit pattern structured and arranged to select connections between the plurality of piezoelectric elements and both of the drive circuit and the detection circuit such that two piezoelectric elements of the first, second and third piezoelectric elements which have the smallest difference in outputs are connected to the detection circuit.

5. A vibrating gyroscope according to claim 4, wherein the circuit pattern includes:

a first terminal and a second terminal formed on the circuit board and each electrically connected to both the drive circuit and the detection circuit;

a third terminal formed on the circuit board and electrically connected to the drive circuit; and first, second and third connection terminals formed on the circuit board and electrically connected to the first, second and third piezoelectric elements, respectively.

6. A vibrating gyroscope comprising:

a column-like vibratable body having a plurality of side surfaces;

first, second and third piezoelectric elements each formed on a respective side surface of the vibrating body and having the same vibration characteristics;

supporting members attached to the vibratable body in the vicinity of nodal points of the vibratable body to support the vibratable body;

a mount base plate connected to the supporting members to support the vibrating body;

a circuit board having a drive circuit for driving the vibrating body and a detection circuit for detecting vibration of the vibrating body;

a selection circuit structured and arrange to select connections between the plurality of piezoelectric elements and both of the drive circuit and the detection circuit, the selection circuit including first, second and third change-over switches provided between the first, second and third terminals and the first, second and third connection terminals such that each of the first, second and third terminals electrically can be connected to one of the first, second and third connection terminals.

7. A vibrating gyroscope according to claim 4, wherein the circuit pattern includes:

first, second and third lead terminal connecting portions formed on the mount base plate and each having three electrodes which are electrically connected to the first, second and third piezoelectric elements, respectively;

a first terminal and a second terminal formed on the circuit board and each electrically connected to both the drive circuit and the detection circuit; and a third terminal formed on the circuit board and electrically connected to the drive circuit.

8. A vibrating gyroscope according to claim 7, wherein the mount base plate is spaced above the circuit board, and wherein the three electrodes of one of the first, second and third lead terminal connecting portions are spaced over and in registration with the first, second and third connection terminals on the circuit board.

9. A vibrating gyroscope comprising:

a column-like vibratable body having a plurality of side surfaces;

first, second and third piezoelectric elements each formed on a respective side surface of the vibrating body and having the same vibration characteristics;

supporting members attached to the body in the vicinity of nodal points of the vibratable body to support the vibratable body;

a mount base plate connected to the supporting members to support the vibratable body;

a circuit board having a drive circuit for driving the vibrating body and a detection circuit for detecting vibration of the vibrating body;

first, second and third terminals formed on the circuit board, the first terminal being connected to the drive circuit and used for a feedback loop for causing self-excited vibration of the vibratable body, each of the second and third terminals being connected to both the drive circuit and detection circuit; and first, second and third connection terminals formed on the mount base, each of the first, second and third connection terminals having three electrodes which are electrically connected to first, second and third piezoelectric elements, respectively, wherein one of the three electrodes of each of first, second and third connection terminals is in registration with the first terminal on the circuit board, and remaining two ones of the three electrodes of each of first, second and third connection terminals are in registration with the second and third terminals on the circuit board, respectively.

10. A vibrating gyroscope according to claim 9, wherein the mount base is located above the circuit board such that the three electrodes of one of the first, second and third connection terminals on the mount base are positioned in a space above the first, second and third terminals on the circuit board, respectively and are electrically connected with the first, second and third terminals, respectively.

11. A vibrating gyroscope according to claim 10, wherein said one of first, second and third connection terminals is selected so that a combination of two of the piezoelectric which have the smallest differences between the outputs with respect to a change in ambient atmosphere temperature.

* * * * *